United States Patent
Chu et al.

(10) Patent No.: US 10,460,003 B2
(45) Date of Patent: Oct. 29, 2019

(54) ADAPTABLE USER INTERFACE

(75) Inventors: Jack Chu, Sunnyvale, CA (US); Chris Mancini, Plano, TX (US); Lawrence Morrisroe, Cupertino, CA (US)

(73) Assignee: OATH INC., New York, NY (US)

( * ) Notice: Subject to any disclaimer, the term of this patent is extended or adjusted under 35 U.S.C. 154(b) by 376 days.

(21) Appl. No.: 12/145,030

(22) Filed: Jun. 24, 2008

(65) Prior Publication Data

US 2008/0256467 A1   Oct. 16, 2008

Related U.S. Application Data

(63) Continuation of application No. 10/656,846, filed on Sep. 4, 2003, now abandoned.

(Continued)

(51) Int. Cl.
*G06F 16/957* (2019.01)
*G06F 3/048* (2013.01)
(Continued)

(52) U.S. Cl.
CPC ............ *G06F 16/957* (2019.01); *G06F 3/048* (2013.01); *G06F 3/0484* (2013.01);
(Continued)

(58) Field of Classification Search
CPC .... G06F 9/4443; G06F 3/0481; G06F 3/0486; G06F 3/0484; G06F 3/04845
(Continued)

(56) References Cited

U.S. PATENT DOCUMENTS 5,581,670 A * 12/1996 Bier et al. ..................... 715/856
6,161,126 A * 12/2000 Wies et al. .................... 709/203
(Continued)

OTHER PUBLICATIONS

Oliver, et al. "Chapter 19. Setting Pages in Motion with Dynamic HTML"; In: "Sams Teach Yourself HTML and XHTML in 24 Hours, 5th Edition" Feb. 15, 2001; Sams, XP 55032527; ISBN: 978-0-67-232076-7; pp. 262-278.
(Continued)

*Primary Examiner* — Christopher J Fibbi
(74) *Attorney, Agent, or Firm* — James J. DeCarlo; Greenberg Traurig, LLP (57) ABSTRACT

In a client-server system where a client system presents a browser for user interaction, a browser user interface includes functionality for handling dynamic interface elements received by the browser in connection with received pages, presented as part of the browser user interface and modified in response to selected user input without requiring further interaction with a server. In addition to, or in place of, dynamic interface elements such as slide sheets, the browser user interface might also include a rotation display area, tool displays that can overlay a page, opaquely or semi-transparently, menu structures, and an ability for the user to modify a page layout without requiring server interaction. The browser might comprise storage for a plurality of rotation display items for storing a summary and a primary presentation for each rotation display item, logic for displaying, by the browser, primary presentations for less all of the plurality of rotation display items in the rotation display area, logic for displaying, by the browser, summaries for items wherein the number of summaries is greater than the number of primary presentations presented at one time, logic for highlighting, among the summaries displayed, the ones of the summaries that correspond to the primary presentations displayed in the rotation display area; and logic for rotating the plurality of rotation display items to display primary presentations for a different subsets of the rotation display items and for updating highlighting of summaries to correspond to the different subsets of rotation display items.

28 Claims, 5 Drawing Sheets

Related U.S. Application Data (60) Provisional application No. 60/410,510, filed on Sep. 13, 2002.

(51) Int. Cl.
*G06F 3/0484* (2013.01)
*G06F 3/14* (2006.01)
*G06F 5/10* (2006.01)

(52) U.S. Cl.
CPC ........ *G06F 3/04845* (2013.01); *G06F 3/1438* (2013.01); *G06F 5/10* (2013.01)

(58) Field of Classification Search
USPC .......................... 715/762, 744, 967, 765, 781
See application file for complete search history.

(56) References Cited

U.S. PATENT DOCUMENTS

| | | | | |
|---|---|---|---|---|
| 6,272,493 | B1* | 8/2001 | Pasquali | G06F 17/30899 707/999.01 |
| 6,469,714 | B2* | 10/2002 | Buxton et al. | 715/762 |
| 6,954,902 | B2* | 10/2005 | Noma et al. | 715/753 |
| 8,397,176 | B2* | 3/2013 | Subramanian | G06F 3/0481 715/711 |
| 2001/0043235 | A1* | 11/2001 | Best et al. | 345/781 |
| 2002/0196279 | A1* | 12/2002 | Bloomfield | G06F 9/541 715/749 |
| 2003/0065638 | A1* | 4/2003 | Robert | G06F 3/0486 |
| 2003/0187968 | A1* | 10/2003 | McKnight | G06F 17/212 709/223 |
| 2005/0097160 | A1* | 5/2005 | Stob | 709/200 |

OTHER PUBLICATIONS

Kingsley-Hughes, et al. "Chapter 12. Dynamic HTML and JavaScript" In: "JavaScript(TM) 1.5 by Example", Jan. 19, 2001, Que, XP55032538, ISBN: 978-0-78-972499-1; pp. 163-165.

* cited by examiner

ADAPTABLE USER INTERFACE

CROSS-REFERENCES TO RELATED APPLICATIONS

This application is a continuation of and claims priority from U.S. patent application Ser. No. 10/656,846, filed Sep. 4, 2003, which claims priority from U.S. Provisional Patent Application No. 60/410,510, filed Sep. 13, 2002 entitled "Browser User Interface" which are hereby incorporated by reference, as if set forth in full in this document, for all purposes.

FIELD OF THE INVENTION

The present invention relates to user interfaces in general and more particularly to a browser interface for browsing pages served over a network.

BACKGROUND OF THE INVENTION

The Internet and other networks interconnect computers and computing devices to allow for easy transport of data over network connections. Commonly computers and computing devices are organized using the client-server model, wherein network connections are established between some computers or computing devices that act as servers and some computers or computing devices that act has clients. Of course, some computers or computing devices can act as servers and clients.

An example of a server is a Web server and an example of a client is a Web client such as a personal computer running a Web browser program. Many different Web clients have been developed and variations of Web clients are being developed regularly. Merely by way of example, a Web client could be embodied in a desktop computer, laptop computer, handheld device, cellular telephone, wireless device, electronic device with embedded Web client functionality, or the like. Generally, all that is required is some user interface and a network interface.

In some instances the user interface is an interface to a programmatic user, but more typically the user interface is an interface usable by a human user. The Web client operates according to the interface to issue requests to Web servers, using well-known protocols or later developed protocols. In response to requests received, Web servers return data responses. In a typical description of Web client-server interaction, the HTTP protocol is assumed to be used, wherein the Web client issues a request directed at a particular Web server address for a page represented by a URL in the request and a server responsive to the particular Web server address responds with data that may be a page to be displayed or other data set. Generally, regardless of the actual data being requested and returned, the data returned is referred to as a web page.

A Web client that is capable of presenting all or part of a web page in a user interface to a user and accepting user input wherein at least some of the user input can cause the Web client to present Anther web pages can be referred to as a "Web browser" because of its common use by a user to navigate among web pages generally considered to be part of a "Web" of pages that reference other pages.

Web browsers are known and are in common use and often provide functionality in addition to presenting web pages and accepting user input related to presented web pages. For example, web pages might include program elements that are executed by a Web browser upon receipt of a web page including such program elements. One example of such program elements are JAVAT™ applets.

Web pages also might include program elements that cause a Web server to take an action. For example, a web server might provide portal services, wherein the Web server collects information from various sources and upon request generates a portal page for a Web client. An example of such a portal page is the main Yahoo! page (www.yahoo.com) and personalized pages provided by My Yahoo! (my.yahoo.com). The latter provides for pages to be delivered to Web clients that are customized based on user preferences stored at the server.

Customized web pages and varied layouts often provide a rich user experience, but if the presentation of information requires moving from web page to web page, the experience is less favorable when network delays occur, as the user waits for pages to arrive and refresh. The experience can also be disorienting if the user has to move from page to page to see desired information. While network delays can occur and are typically beyond the control of the web server operator, users typically associate negative experiences due to network delays with the services provided by the web server operator. Therefore, it would be desirable to mitigate perceived delays that might be caused by network delays.

BRIEF SUMMARY OF THE INVENTION

In a client-server system where a client system presents a browser for user interaction with server data or resources, a browser user interface includes functionality to request pages from servers over a network and to process received pages for presentation to a browser user, the browser user interface comprising a graphical display, a user input device and storage for dynamic interface elements received by the browser in connection with received pages, wherein a dynamic interface element is able to be presented as part of the browser user interface and modified in response to selected user input without requiring further interaction with a server. In addition to, or in place of, dynamic interface elements such as slide sheets, the browser user interface might also include a rotation display area, tool displays that can overlay a page, opaquely or semi-transparently, menu structures, and an ability for the user to modify a page layout without requiring server interaction.

The rotation display area might comprise some or all of a display area used for a page display and the browser further comprising storage for a plurality of rotation display items for storing a summary and a primary presentation for each rotation display item, logic for displaying, by the browser, primary presentations for less all of the plurality of rotation display items in the rotation display area, logic for displaying, by the browser, summaries for items wherein the number of summaries is greater than the number of primary presentations presented at one time, logic for highlighting, among the summaries displayed, the ones of the summaries that correspond to the primary presentations displayed in the rotation display area; and logic for rotating the plurality of rotation display items to display primary presentations for a different subsets of the rotation display items and for updating highlighting of summaries to correspond to the different subsets of rotation display items.

Other features and advantages of the invention will be apparent in view of the following detailed description and preferred embodiments.

DETAILED DESCRIPTION OF THE INVENTION

The present invention has many applications, as will be apparent after reading this disclosure. In describing an embodiment of a browser interface system according to the present invention, only a few of the possible variations are described. Other applications and variations will be apparent to one of ordinary skill in the art, so the invention should not be construed as narrowly as the examples, but rather in accordance with the appended claims.

Embodiments of the invention will now be described, by way of example, not limitation. It is to be understood that the invention is of broad utility and may be used in many different contexts.

The example of a browser session is a user at a user location operating a user computer to control a browser, which is typically software running on a general purpose user computer, but might be another device, such as a dedicated hardware browser or firmware operated by a portable device. The browser sends requests over a network for pages or portions of pages and displays received pages or portions of pages. The browser might also maintain local data storage for cookies, cached pages, scripts, code and the like. Typically, the browser requests are directed over the network to page servers, such as HTTP (HyperText Transport Protocol) servers (also called "web servers" as the pages served are often considered part of the World Wide Web of hyperlinked documents). The user can be a human or a machine, but is more often a human user.

A "page" might be a conventional HTML page returned in response to a browser request, which can be a pre-existing page or a page generated in response to the request. The page might contain display portions, formatting portions and executable portions. As used herein, the term page might refer to HTML pages, messages, data blocks, packets, or other structured or unstructured data units that are considered logic units in a page request system.

Referring now to the figures, an exemplary browsing system will now be described.

Figure 1:
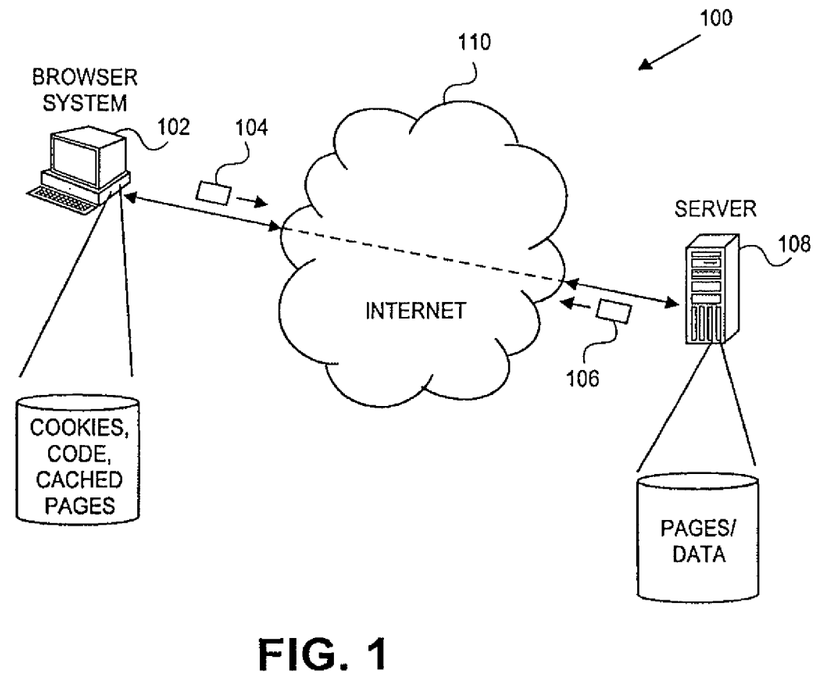
FIG. 1 is a block diagram of a computer system according to embodiments of the present invention.

FIG. 1 is a block diagram of a system 100 according to embodiments of the present invention. Using system 100, a user can operate a client system 102 running a browser to send requests 104 for pages and receive responses 106 to those requests from servers 108. Responses 106 are typically pages, but under error conditions, such as when a page does not exist, a request is malformed, a server is not available or the requesting user does not have access authority, response 106 might be an error message or an error page.

FIG. 1 shows only one client and one server, but it should be understood that the typical system might have many clients and many servers. As shown, server 108 is a separated from client system 102 by a network 110, in this case a global internetwork of networks known as the "Internet". The bandwidth and responsiveness of a client—the server path through network 110 can sometimes diminish the browsing experience. Since the typical browsing system can handle the necessary computing tasks quickly, the network and/or servers are more typically the cause of bottlenecks and slowdowns. However, by using some of the techniques described herein, a browsing system can make requests and a server can respond with pages having features that can provide responsiveness to the user even in the face of network slowdowns.

Figure 2:
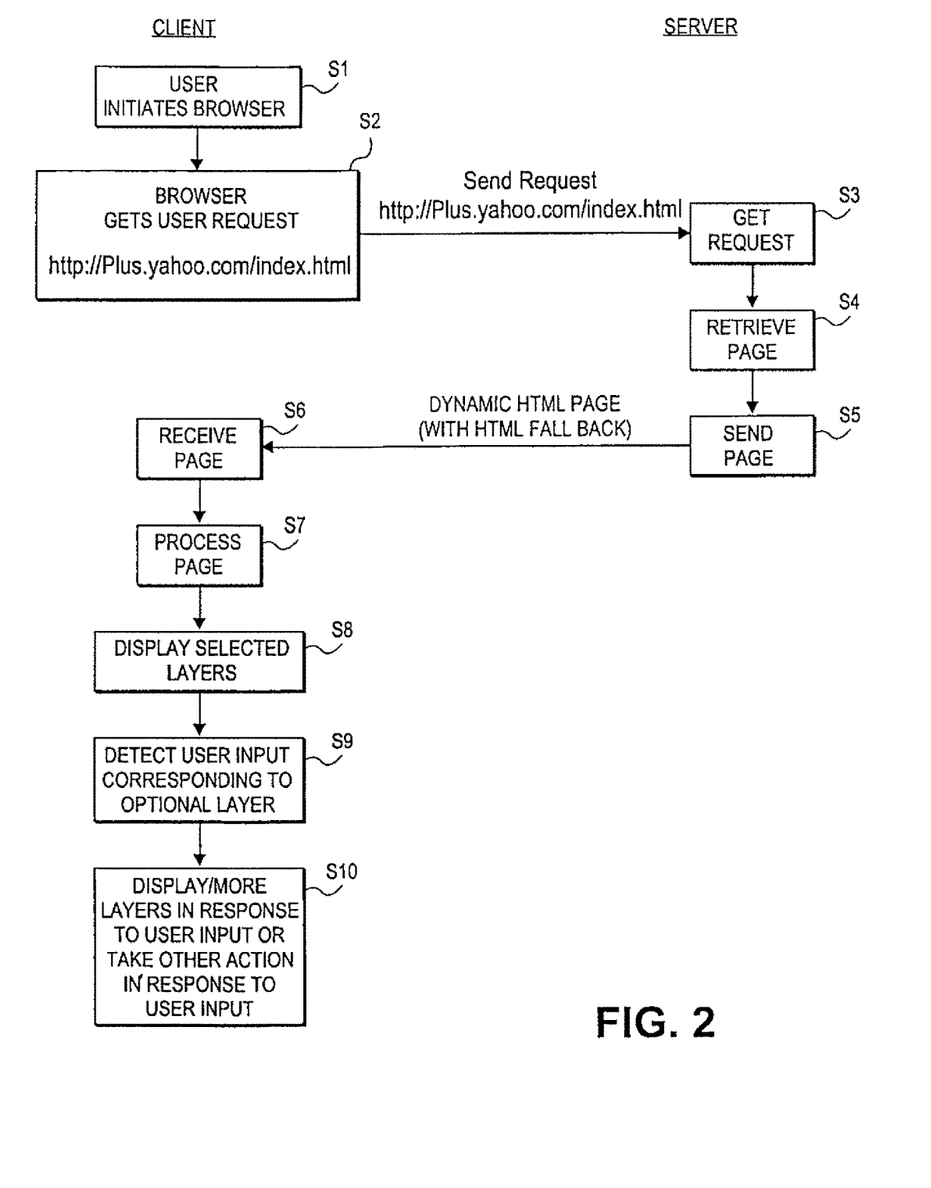
FIG. 2 is a swim diagram of client-server interactions as might be done with the computer system of FIG. 1.

FIG. 2 is a swim diagram illustrating actions and flows between a client (such as the user's browser) and a server, wherein each communicates using a protocol such as HTTP and/or its extensions. The steps executed by the client or server are labelled in the order shown with labels "S1", "S2", "S3", etc. Other steps, not shown, might also be performed and not all of the labelled steps need be performed.

Once the user initiates an instance of the browser (S1), the browser can accept input from the user. In this example, the user has requested the page identified by the URL (Uniform Resource Locator) "http://PLUS.yahoo.com/index.html" and the browsers gets this request from the user (S2). The browser can get the request by the user typing in the URL, selecting from a bookmark list, clicking on a link of a displayed page or other method. The browser then sends an HTTP request to the server identified with the domain portion of the URL of the request (i.e., "PLUS.yahoo.com" in this example).

Once the server receives the request (S3), it retrieves the page (S4) and sends it to the requesting browser (S5). The page might contain HTML data, such as page text, formatting and the like, but would also contain dynamic elements. One standard for such dynamic elements is the DHTML (Dynamic HyperText Markup Language) standard. Once the browser receives the page (S6), the browser processes the page (S7) and displays the selected layers to the user (S8).

With the selected layers of the DHTML pages displayed, the user might then select an element on the display to cause an action. Some selection might be done by positioning a cursor over an element, while other selection might also include indicating a selection such as by pressing a mouse button with the cursor over an element. Of course, to the browser, the happenstance presence of a cursor somewhere on the display can be treated as a positioning selection, so that the action taken by positioning a cursor might be taken even if the user did not change the position of the cursor as would normally be expected for what is understood as "selecting".

However a selection action or event is noted, the browser detects or interprets user input (S9) and then takes an action for that selection based on the DHTML code for the element selected (S10). Examples of pages and elements are described below. While DHTML has been in use for presenting content and positioning content, examples shown below provide for tools with interface elements (e.g., buttons, forms) on layers and/or uses of layers for interfacing.

Figure 3:
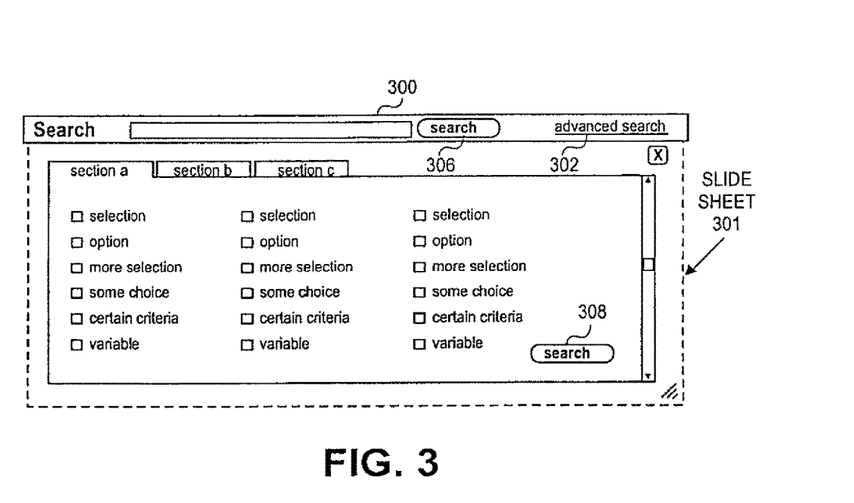
FIG. 3 is an illustration of an advanced search slide sheet.

FIG. 3 illustrates a portion of a page 300 with dynamic interface elements. Page 300 is passed to a browser as a DHTML page, with all the components needed for the interface included in the DHTML page. This allows the browser to respond to user actions without requiring another request to be sent to a server, possibly delaying the response. As shown there, a "slide sheet" 301 for advanced searching descends from a search toolbar when activated, either by the user selecting the "advanced search" button or merely rolling a cursor over the button.

With the advanced search slide sheet, the user can perform advanced searches without appearing to move away from a current page being displayed, as the search toolbar could be part of the currently displayed page, with opening the slide sheet only obscuring a part of that displayed page.

The DHTML "advanced search" link can be represented by a text element 302 or a graphical element, possibly providing a consistent visual language to denote such dynamic links. When a user has not selected the advanced search, the slide sheet remains hidden and when selected, appears to slide down from behind the toolbar. The slide sheet can contain various advanced search option elements. A tabular navigation system can be used within the slide sheet if advanced options need to be separated into sections. Depending on the display real estate available for the slide sheet and the number of elements to be presented, the slide sheet might also include scroll elements to allow for scrolling of the elements within the real estate allotted. In some implementations, the slide sheet could be vertically expandable so that the user can control the real estate used, possibly obviating the need for the scroll bar.

Within the slide sheet shown, a "search" button 306 is provided that might initiate an action that works the same way, or in a similar way, as a "search" button 308 provided in the search toolbar and usable even when slide sheet 301 is hidden. The user can close slide sheet 301 by completing a search, clicking on either search button, clicking outside the slide sheet, clicking the "advanced search" element 302 again or by clicking the "x" close window icon on the top right corner of slide sheet 301.

Such a search slide sheet might be used in various areas of a portal site, such as a main page, a music page, a movies page, a games page, a sports page, a local new/information page and/or a news page. A finance page might incorporate a similar tool for functions such as ticker look up. If each of those pages has different search elements, the side sheets can be different for different pages. The selections made by the user on the slide sheet, or other dynamic interface element, can be stored at the client system and conveyed to the server that sent the page (or other designated server) asynchronously or synchronously (blocking). For example, one server might provide a page to a browser that designates a second server as the server to collect user input collected from a dynamic interface element. Preferably, if a delay is possible all, the client system might take an action based on user input on a dynamic interface element even before a server receives the collected user input.

In some cases, a user might request a page having such DHTML elements, but not have a browser capable of processing DHTML constructs. In such cases, the DHTML page would be configured to substitute other functionality. For example, when a user with a non-enabled browser selects advanced search element 302, they would be directed to an HTML page for advanced search, typically taking the user away from the page containing the element.

Figure 4:
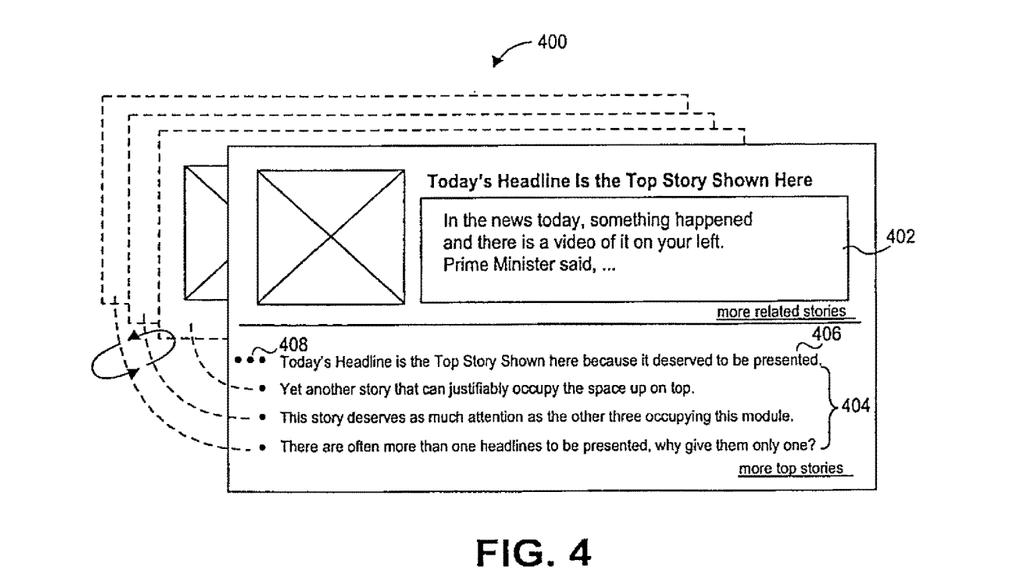
FIG. 4 is an illustration of a dynamic item and summary display, as might be used to show news headlines and text.

In another instance, dynamic content delivery is provided within a page using dynamic interface elements, thus allowing the user to remain with a page and see additional elements. An example of such a dynamic content delivery construct is shown in FIG. 4. With such a construct, a number of summaries of items are shown, with one of the items shown. In this example, the items are news stories and the summaries are headlines, but other types of items are possible.

Dynamic layer 400 is used for display of an item 402 and summaries 404 for that item and other items. The summary corresponding to the display item, summary 406 in this case, is shown with a visual cue 408, thus allowing the user to quickly identify which headline is being shown in greater detail above. If the displayed item has associated images or video, or other media, it can be displayed in area 410. Depending on the selection and/or cursor position, the browser might (according to instructions in the page provided by a server) transition automatically through each of the items, showing it in turn and stopping when the user selects a specific item, either by clicking on the item, clicking on the summary, moving the cursor to the summary, or taking another indicative action.

This content delivery mechanism might be found on main pages within properties of a portal web site. In a main news page, top and featured stories can be dynamically rotated in order to serve up more information to the user. The user is able to interrupt the rotation by directly selecting a particular top story from a short list featured on the page, or maybe by just moving the cursor into an item display area or holding down a key. To get the full story (more than just the item shown, in most cases), the user can select the item or the headline.

The automatic transitioning between items can be done in a number of ways. For example, the browser could rotate through the items, fading out one and fading in another. One way to do this is to have the current item in one layer, the next item on another layer, with the next item's layer being transparent and on top of the current layer and gradually increase the opacity of the next item's layer. Alternatively, the current layer might be opaque and on top with that layer gradually becoming more transparent. In some cases, where the items contain media that take time to display, the rotation of a current item out and a next item in might be tied to when the current item is done displaying, such as beginning the transition shortly after the current item is done playing. Where controls are provided to control the playing of media, such as rewind, pause and fast forward, the user might control when the rotation occurs. In any case, the browser should delay enough to allow for comfortable reading of the text presented and present a visual and/or audio cue that a transition is to begin.

When the display transitions from one item to another, the visual cues, such as visual cue 408 would change to the now current item. The order of rotation can be random or defined by some set of rules, but an expected order might be from top to bottom, repeating the top item when the bottom item is rotated out. The list of item summaries (and thus the items) might be sorted at the server by importance or interest.

In addition to the rotated in items and their summaries, dynamic layer 400 might also provide links such as "more top stories" and "see related stories" that take the user away from the current page to new pages, as with conventional links.

Other cues might be provided to the user. For example, a cue might be provided when a user rolls a cursor over the highlighted story to indicate that the rotation is paused. To avoid jarring actions, the browser (again controlled by instructions from the page) might delay action on a roll over for a few seconds and then perform a smooth transition.

Since each of the transitions between items and navigation among elements of dynamic layer 400 can be handled by the browser without reference to a server, the user interaction can happen quickly without concern for network activity or bottlenecks. If statistic information on views is needed, the page can collect status messages and send those to the server (useful for determining which items are of interest over a large audience and which are not), but such server interaction does not delay the display experience.

Such a dynamic layer page might be used in various areas of a portal site, such as a main page, a music page, a movies page, a games page, a sports page, a local new/information page and/or a news page. In some cases, a user might request a page having such DHTML elements, but not have a browser capable of processing DHTML constructs. In such cases, the DHTML page would be configured to substitute other functionality. For example, a user with a non-enabled browser might be presented with the items and summaries, but have to select a summary to view the item.

Where the item includes a video object, that object can be presented directly, via a plug-in or the like, in one of the layers. With the video handled directly, opening an external player is not needed, thus making the pages more flexible. For example, the area allocated to the video could be automatically adjusted based on a detected aspect ratio, and the area can be expanded or contracted by the user without requiring a reload of the video stream.

Figure 5:
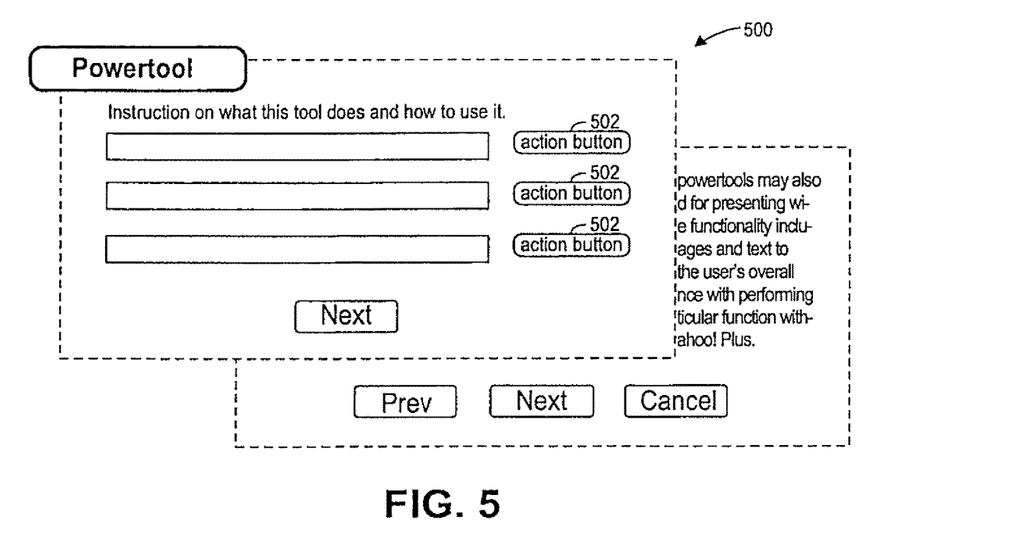
FIG. 5 is an illustration of a tool layer.

Another example of a use of dynamic pages is shown in FIG. 5. There, a tool layer 500 is shown. Tool layer 500 allows users to perform popular activities and/or actions without leaving a page of focus. Tool layer 500 includes buttons, such as buttons 502 that react in some ways when they are rolled over to indicate their rich dynamic functionality, such as highlighting and a tool tip after a delay. The page includes DHTML layer(s) with all the necessary interactive elements for the user to complete the activity or action, typically without requiring communication with the server. For a wizard-like activity or tour, this module can be self-contained and close upon completion, with the user inputs recorded at the client system, being transmitted to a server as needed.

When a tool is selected, by a click or otherwise, the user is presented with a DHTML layer (preferably, through a consistent visual transition) wherein the interactive elements necessary to complete the task are contained. Links contained within this module typically pop up another browser window.

Such tool layers can be used in a number of ways. For example, a main portal page might include a tool button for sending an e-mail. In response, the browser could present a new layer for entry of the e-mail, without the user perceiving any direction away from the main portal page. Furthermore, since the e-mail layer is part of the page already at the browser, the opening of the layer and the restoring of the main page will not be delayed by network or server delays. Other uses might include website services for quickly uploading files, calendar updates, photo uploading, searches, yellow page inquiries, etc.

For a layer such as an e-mail layer, the portion used for entry of the e-mail can be semitransparent, to keep the user oriented with the page from which the e-mail function was selected. This will often result in a less disorienting, cleaner presentation. Fading can be provided as well.

To accommodate browsers without dynamic page or DHTML capability, the server could detect, by "sniffing" or otherwise, whether a browser is enabled and then serve up the dynamic page or fall back to a separate page without the tool capability.

Figure 6:
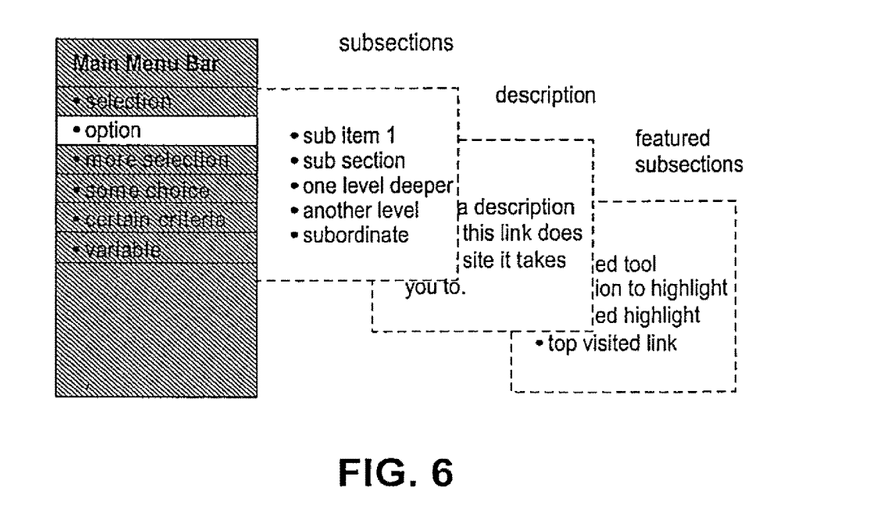
FIG. 6 is an illustration of navigation using layers.

In addition to dynamic pages that include user interface elements, such as buttons and forms, some dynamic pages might operate without such elements. For example, FIG. 6 shows the use of layers for subnavigation. One implementation of subnavigation layers is using a DHTML pop-up that reveals the subsections and/or subcategories of main menu items. The submenus can be revealed when the user rolls over links on the main menu. If the main menu does not have an apparent set of subnavigation items, this layer might be used to describe the menu item and/or provide quick links to popular subsections within that item.

In some systems, to keep the interaction simple, the selected menu item is highlighted when selected and a limited number of sublevels (such as one sublayer) are used. In the example of FIG. 6, when the user rolls over a top level menu, the subsection DHTML menu or description will appear on the right side. The DHTML submenu should remain open as long as the cursor remains in the main menu item selected or in the DHTML submenu itself, but DHTML submenus disappear when user rolls away from the selected item or the DHTML menu itself.

Such layers might be used in various areas of a portal site, such as a main page, a music page, a movies page, a games page, a sports page, a local new/information page and/or a news page. In some cases, a user might request a page having such DHTML elements, but not have a browser capable of processing DHTML constructs. In such cases, the DHTML page would be configured to substitute other functionality, such as showing the submenu items beneath menu items in a flattened, indented menu and, for menu items that do not have subsections, take the user to the page itself when the link is clicked.

Figure 7:
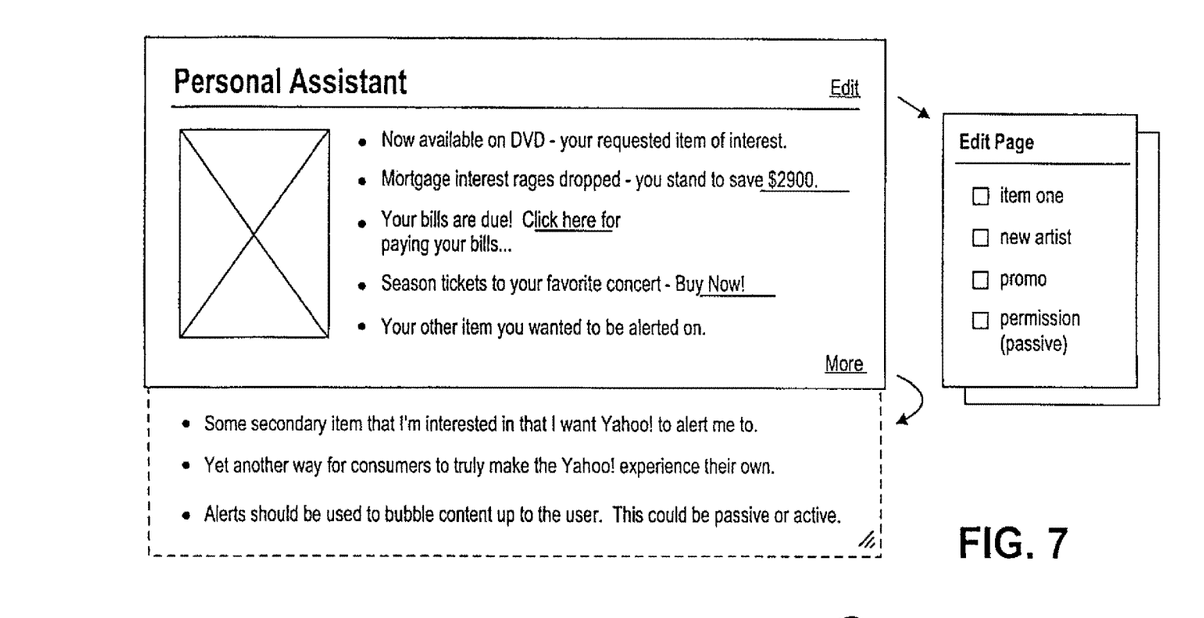
FIG. 7 is an illustration of a personalized page having tools.

Some pages can be complex combinations of constructs described above. For example, FIG. 7 shows a "personal assistant" set of layers for performing tasks specific to the user. In some cases, the dynamic (DHTML or other protocol) page used can be cached by the user so that the servers do not have to repeatedly send a user's page to the user, for thousands or millions of users. This can be so even if the content of the page were to change as the cached page could include placeholders for information that is retrieved from a server each time the page is used, even if the page itself is not retrieved each time.

With the personal assistant set of layers, an "assistant" module within certain properties is provided where content, tools, features and promotions are presented up front based on the user's preferences, which can be managed actively or passively. The customization might comprise event alerts (i.e., auctions results, concert tickets going on sale, etc.), information alerts (news, finance), promotions (new product release) or personal information (bills due, etc.). Preferably, the list is limited to some number (such as 10) entries to avoid clutter and has links that lead to the items themselves. For example, an "edit" link allows the user to edit their preferences on a separate page. This separate page will contain explicit items and preferences the user chooses, permission for promotional items to be featured, permission for passive personalization to be used, promotion or news of upcoming personalization features, etc. A "more" link might reveal additional personalization items through a vertically expandable DHTML slide sheet if the module cannot initially contain all items.

If the user has not personalized their module, it will contain promotion, instruction, or tour for the Assistant module. When the Assistant is personalized, it will contain a finite list of items actively or passively customized to the user's preferences. The items listed might contain links, which when clicked will allow users to interact further with that specific item. If the module cannot fully contain all the personalization items, a "more" link will be provided, which when clicked, will present a sliding sheet to reveal the rest of the list.

Preferences may contain actively customizing the types of alerts or content the module presents and filters, it may also include color customization, graphical element and other personalization features.

Such layers might be used in various areas of a portal site, such as a main page, a music page, a movies page, a games page, a sports page, a local new/information page and/or a news page. In some cases, a user might request a page having such DHTML elements, but not have a browser capable of processing DHTML constructs. In such cases, the DHTML page would be configured to substitute other functionality, such as sending the user to a separate page listing all the items when they click on "more".

Figure 8:
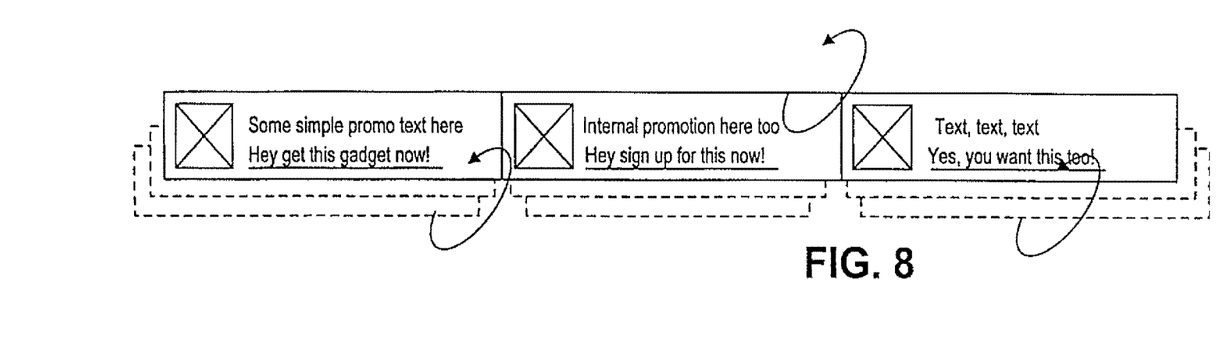
FIG. 8 is an illustration of a promotional and/or information tool layer with rotating spaces.

Yet another dynamic page is illustrated in FIG. 8. There, a premium promotional module is shown, which rotates among a series of promotional or informational items, using a consistent and unobtrusive animated transition. The items appear in one of a plurality of spaces, and the items might transition from spaces in a staggered schedule so that they to not all transition at once. By way of example, a top page of a portal web site might contain a promotional module.

The transition might be consistent with other transitions of other dynamic pages, such as an animation, fade in, box in, etc. The rotation can occur even if the user is idle, preferably being unobtrusive and consistent throughout the module. If the user rolls over a particular space, the rotation for that space will be paused, with rotation resuming when the user rolls away from the module or space. Links within the modules will act like regular links. Users with non-DHTML enabled browsers can be provided with such a set of spaces, but the rotation will likely not be present.

One underlying architecture that could be used to present features described above is to have separate tools on layers of a DHTML page and move the layers by changing their position, thus obviating the need for a page refresh. Where some of the changes should be sticky, such as when the user drags one layer to a new position or changes positions of layers relative to each other, the change could be done without refreshing the page from the server, by the changes might be communicated to the server so that the next time the user comes to that page, the layers are in the order the user put them in at the last visit. In effect, this allows the user to drag and drop portions of a portal page layout, for example, and see them move relative to each other at speeds that might not be possible given network and/or server conditions. The communication of the change can be sent to the server without blocking the movement at the user's machine. In addition to communicating changes, references that a user makes, such as navigating a submenu or selecting an item for further detail, can be communicated to the server even though server action is not needed to respond to the user's action.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
    displaying a web page to a user, the web page being displayed in a browser window on a computing device, the web page comprising a plurality of Dynamic Hypertext Markup Language (DHTML) page layers, each DHTML page layer having an initial position in the browser window relative to other DHTML page layers of the plurality, each DHTML page layer comprising a plurality of interface elements;
    monitoring, via the computing device, user interactions with the browser window to identify user input respective to at least one DHTML page layer of the web page, said monitoring comprising determining when the user is dragging a selected DHTML page layer to a new layer position within the browser window respective to non-selected DHTML page layers;
    altering, via the computing device, the initial position of the selected DHTML page layer within the web page based on said user interactions and embedded information associated with the selected DHTML page layer, said altering causing the selected DHTML page layer comprising the plurality of interface elements of the web page to be automatically displayed in the new layer position, among the DHTML page layers, to which the selected DHTML page layer was dragged by the user without retrieving additional information from a server;
    displaying, via the computing device, the altered web page in the browser window; and
    launching, via the computing device, within the web page and in response to user selection of one of the plurality of interface elements of the selected DHTML page layer, a new DHTML page layer corresponding to the selected interface element at an initial position in the browser window relative to the other DHTML page layers.

2. The method of claim 1, each DHTML page layer representing at least one tool.

3. The method of claim 1, further comprising communicating the assigned position of the selected DHTML page layer to the server.

4. The method of claim 1, at least one of the DHTML page layers comprising a submenu.

5. The method of claim 4, further comprising communicating to the server that the user has made a selection from the submenu.

6. A system comprising:
    a plurality of processors; and
    at least one of said plurality of processors processing a first page layer, defined in an DHTML (Dynamic Hypertext Markup Language) document and displayable by a web browser operating on a computing device, said first DHTML page layer comprising a plurality of interface elements;
    at least one of said plurality of processors processing a second page layer, defined in the DHTML document and displayable by the web browser, said second DHTML page layer comprising a plurality of interface elements, wherein each DHTML page layer has an initial position in the web browser relative to other DHTML page layers;
    at least one of said plurality of processors interpreting instructions which allow a user to reposition at least one of the first DHTML page layer and the second DHTML page layer respective to each other within the web browser display without requiring a page refresh, wherein said repositioning comprises the user dragging a selected DHTML page layer to a new layer position within the web browser window respective to non-selected DHTML page layers, said repositioning of the selected DHTML page layer and interface elements comprised therein being based upon user interactions with the DHTML page layers and embedded information associated with the DHTML page layers, wherein the selected DHTML page layer of the web page is automatically displayed in the new layer position, among the DHTML page layers, to which the selected DHTML page layer was dragged by the user; and at least one of said plurality of processors interpreting instructions which allow the user to select one of the plurality of interface elements of the selected DHTML page layer, causing a third DHTML page layer corresponding to the selected interface element to be launched at an initial position in the browser window relative to the other DHTML page layers.

7. The system of claim 6, further comprising instructions, interpretable by the web browser, which allow the new positions of the first DHTML page layer and the second DHTML page layer to be transmitted to a server.

8. The system of claim 6, the instructions further allowing the first DHTML page layer and second DHTML page layer to be repositioned without the browser requesting additional information from a server.

9. The system of claim 6, the instructions further allowing the first DHTML page layer to overlap the second DHTML page layer.

10. The system of claim 6, the instructions repositioning the second DHTML page layer such that the second DHTML page layer is not obscured by the first DHTML page layer when the first DHTML page layer is repositioned within the web browser display.

11. The system of claim 6, at least one of the first DHTML page layer and the second DHTML page layer being opaque.

12. The system of claim 6, at least one of the first DHTML page layer and the second DHTML page layer being semi-transparent.

13. The system of claim 6, at least one of the first DHTML page layer and the second DHTML page layer comprising a slide sheet.

14. The system of claim 13, the slide sheet control being operable in at least a first orientation and a second orientation, the second orientation occupying substantially more of the web browser display than the first orientation.

15. The system of claim 14, the slide sheet control comprising search functionality and the second orientation thereof presenting at least one of additional search related features and additional search related options.

16. The system of claim 14, the second orientation being displayable without obtaining additional information from the server.

17. The system of claim 14, the second orientation being displayed in a layer such that the second orientation at least partially obscures a portion of the first layer.

18. The system of claim 6, at least one of the first DHTML page layer and the second DHTML page layer comprising a DHTML page layer.

19. A method comprising:

receiving from a user computing device a request for a web page, the web page being displayable by a web browser running on the computing device;

separating components of the web page into a plurality of Dynamic Hypertext Markup Language (DHTML) page layers, each DHTML page layer having an initial position when displayed by the web browser relative to other DHTML page layers of the plurality, each DHTML page layer comprising a plurality of interface elements;

incorporating into the web page instructions which allow the web browser to:

i) monitor user interactions with the web browser to identify user input respective to at least one DHTML page layer of the web page, said monitoring comprising determining when the user is dragging a selected DHTML page layer to a new layer position in the browser window respective to non-selected DHTML page layers;

ii) alter the initial position of the selected DHTML page layer within the web browser such that the selected DHTML page layer comprising the plurality of interface elements is displayed in the new layer position, among the DHTML page layers, to which the selected DHTML page layer was dragged by the user without retrieving additional information from a server, said altering based on said user interactions and embedded information associated with the selected DHTML page layer;

iii) display the altered web page in the web browser;

iv) launch within the web browser, in response to user selection of one of the plurality of interface elements of the selected DHTML page layer, a new DHTML page layer corresponding to the selected interface element at an initial position in the web browser relative to the other DHTML page layers; and transmitting the web page in response to the request.

20. The method of claim 19, each DHTML page layer representing at least one tool.

21. The method of claim 19, further comprising communicating the assigned position of the selected DHTML page layer to the server.

22. The method of claim 19, at least one of the DHTML page layers comprising a submenu.

23. The method of claim 22, further comprising communicating to the server that the user has made a selection from the submenu.

24. A non-transitory computer-readable storage media having computer-readable instructions tangibly stored thereon, the computer-readable instructions, when executed by a computer, comprising:

instructions, executed by the computer, for receiving from a user computing device a request for a web page, the web page being displayable by a web browser running on the computing device;

instructions, executed by the computer, for separating components of the web page into a plurality of Dynamic Hypertext Markup Language (DHTML) page layers, each DHTML page layer having an initial position when displayed by the web browser relative to other DHTML page layers of the plurality, each DHTML page layer comprising a plurality of interface elements;

instructions, executed by the computer, for incorporating into the web page instructions which allow the web browser to:

i) monitor user interactions with the web browser to identify user input respective to at least one DHTML page layer of the web page, said monitoring comprising determining when the user is dragging a selected DHTML page layer to a new layer position in the browser window respective to non-selected DHTML page layers;

ii) alter the initial position of the selected layer within the web browser such that the selected DHTML page layer comprising the plurality of interface elements is displayed in the new layer position, among the DHTML page layers, to which the selected DHTML page layer was dragged by the user without retrieving additional information from a server, said altering based on said user interactions and embedded information associated with the selected DHTML page layer;

iii) display the altered web page in the web browser;

iv) launch within the web browser, in response to user selection of one of the plurality of interface elements of the selected DHTML page layer, a new DHTML page layer corresponding to the selected interface element at an initial position in the web browser relative to the other DHTML page layers; and instructions, executed by the computer, for transmitting the web page in response to the request.

25. The non-transitory computer-readable storage medium of claim 24, each DHTML page layer representing at least one tool.

26. The non-transitory computer-readable storage medium of claim 24, further comprising communicating the assigned position of the selected DHTML page layer to the server.

27. The non-transitory computer-readable storage medium of claim 24, at least one of the DHTML page layers comprising a submenu.

28. The non-transitory computer-readable storage medium of claim 27, further comprising communicating to the server that the user has made a selection from the submenu.

* * * * *